(12) United States Patent
Yun et al.

(10) Patent No.: US 9,135,947 B2
(45) Date of Patent: Sep. 15, 2015

(54) SPINDLE MOTOR HAVING SEALING CAP WITH CURVED PART AND HARD DISK DRIVE INCLUDING THE SAME

(71) Applicant: SAMSUNG ELECTRO-MECHANICS CO., LTD., Suwon (KR)

(72) Inventors: Kwan Soo Yun, Suwon (KR); Shin Young Cheong, Suwon (KR); Ta Kyoung Lee, Suwon (KR); Song Bon Oh, Suwon (KR)

(73) Assignee: SAMSUNG ELECTRO-MECHANICS CO., LTD., Suwon-Si (KR)

( * ) Notice: Subject to any disclaimer, the term of this patent is extended or adjusted under 35 U.S.C. 154(b) by 1 day.

(21) Appl. No.: 13/859,439

(22) Filed: Apr. 9, 2013

(65) Prior Publication Data

US 2014/0118859 A1 May 1, 2014

(30) Foreign Application Priority Data

Nov. 1, 2012 (KR) .......................... 10-2012-0123069

(51) Int. Cl.
*G11B 17/08* (2006.01)
*G11B 17/02* (2006.01)
(Continued)

(52) U.S. Cl.
CPC .......... *G11B 19/2045* (2013.01); *F16C 17/107* (2013.01); *F16C 33/74* (2013.01); *G11B 19/2036* (2013.01)

(58) Field of Classification Search
CPC G11B 19/2036; G11B 19/2045; F16C 33/74; F16C 17/107

USPC .................................. 360/98.07, 99.04, 99.08
See application file for complete search history.

(56) References Cited

U.S. PATENT DOCUMENTS 6,115,213 A * 9/2000 Ikeda et al. ................. 360/99.08
7,365,939 B2 * 4/2008 Gomyo et al. ............. 360/99.08
(Continued)

FOREIGN PATENT DOCUMENTS

| JP | 10-148212 | 6/1998 |
| JP | 2002-235736 | 8/2002 |
| JP | 2006-53962 | 2/2006 |
| JP | 2012-193840 | 10/2012 |
| KR | 10-2007-0029457 | 3/2007 |
| KR | 10-2012-0022546 | 3/2012 |

OTHER PUBLICATIONS

Japanese Office Action mailed Dec. 24, 2013 in corresponding Japanese Application No. 2013-079935.
(Continued)

*Primary Examiner* — Gustavo Polo
(74) *Attorney, Agent, or Firm* — Staas & Halsey LLP

(57) ABSTRACT

There are provided a spindle motor and a hard disk drive including the same. The spindle motor includes a shaft fixedly installed on a base member and including an upper thrust member, a sleeve rotatably supported by the shaft, a hub extended from the sleeve in an outer diameter direction, and a sealing cap mounted on the hub, wherein the upper thrust member and the sleeve or the hub include a liquid-vapor interface formed therebetween, wherein a gap between facing surfaces of the sealing cap and the upper thrust member in the axial direction is narrow enough to form a labyrinth seal, and wherein the sealing cap includes a curved part curved so that a gap between the sealing cap and the upper thrust member at a portion of the sealing cap facing the upper thrust member in the axial direction is varied in a radial direction.

21 Claims, 8 Drawing Sheets

(51) Int. Cl.
*G11B 19/20* (2006.01)
*F16C 33/74* (2006.01)
*F16C 17/10* (2006.01)

(56) References Cited

U.S. PATENT DOCUMENTS

| | | |
|---|---|---|
| 2006/0031864 A1 | 2/2006 | Kiriyama et al. |
| 2007/0058292 A1 | 3/2007 | Choi et al. |
| 2009/0140587 A1 | 6/2009 | Popov et al. |
| 2012/0033329 A1 | 2/2012 | Mizukami et al. |
| 2013/0120868 A1 | 5/2013 | Mizukami et al. |

OTHER PUBLICATIONS

Korean Office Action issued Nov. 15, 2013 in corresponding Korean Patent Application No. 10-2012-0123069.
Mechanical Engineers Handbook: Materials and Mechanical Design, vol. 1, 3rd Edition, Chapter 33 (Seal Technology), 2006, p. 1188.
"Computational Fluid Dynamic and Rotordynamic Study on the Labyrinth" by Rui Cao, Jun. 14, 2012, pp. 48 and 49, and Figures 3-5, 3-6, 3-7.

* cited by examiner

SPINDLE MOTOR HAVING SEALING CAP WITH CURVED PART AND HARD DISK DRIVE INCLUDING THE SAME

CROSS-REFERENCE TO RELATED APPLICATIONS

This application claims the priority of Korean Patent Application No. 10-2012-0123069 filed on Nov. 1, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A hard disk drive (HDD), an information storage device, reads data stored on a recording disk or writes data to a recording disk using a read/write head.

The hard disk drive requires a recording disk driving device capable of driving the recording disk. In the recording disk driving device, a small spindle motor is used.

An upper portion of the spindle motor has a rotor hub mounted thereon on which the recording disk is mounted, wherein the rotor hub has a disk shape extended in a radial direction, based on a shaft. Therefore, the recording disk mounted on the rotor hub may be fixed by a clamp provided on an upper surface of the rotor hub in an axial direction.

However, according to the related art, a thickness standard of a hard disk drive (HDD) is 9.5 mm in a hard disk drive for a mobile device and 15 mm in a hard disk drive for a server. Therefore, a spindle motor mounted in the hard disk drive may be somewhat elongated in the axial direction. That is, a bearing span between upper and lower radial bearings may be sufficiently secured.

However, in accordance with the recent trend for the miniaturization of electronic devices, it has been demanded that hard disk drives used in electronic devices have a miniaturized thickness standard of 5 mm or less. Therefore, the spindle motor used in the hard disk drive has been formed to have a significantly short length in the axial direction.

In accordance with the trend for thinness in spindle motors as described above, a method of keeping the clamp provided on the upper surface of the rotor hub in the axial direction from wasting space in the axial direction has been demanded.

In addition, since an amount of lubricating fluid capable of being provided in a bearing clearance is naturally decreased in a spindle motor of which a length in the axial direction is reduced, a method of preventing scattering of the lubricating fluid has been demanded.

The following Related Art Document has disclosed a clamp member 50 provided on a hub.

RELATED ART DOCUMENT

Korean Patent Laid-Open Publication No. 2007-0029457

SUMMARY OF THE INVENTION

An aspect of the present invention provides a spindle motor capable of allowing a clamp fixing a recording disk to not occupy space in an axial direction.

Another aspect of the present invention provides a spindle motor having a structure capable of efficiently decreasing scattering of a lubricating fluid.

According to an aspect of the present invention, there is provided a spindle motor including: a shaft fixedly installed on a base member and including an upper thrust member provided in an upper portion thereof and protruded in an outer diameter direction; a sleeve rotatably supported by the shaft by fluid dynamic pressure; a hub extended from the sleeve in an outer diameter direction; and a sealing cap mounted on the hub and extended to an upper portion of the upper thrust member in an axial direction so as to cover a space formed between the upper thrust member and the hub in the axial direction, wherein the upper thrust member and the sleeve or the hub include a liquid-vapor interface formed therebetween, wherein a gap between facing surfaces of the sealing cap and the upper thrust member in the axial direction is narrow enough to form a labyrinth seal, and wherein the sealing cap includes a curved part curved so that a gap between the sealing cap and the upper thrust member at a portion of the sealing cap facing the upper thrust member in the axial direction is varied in a radial direction.

The curved part may be formed so that at least one portion in which the gap between the sealing cap and the upper thrust member at the portion of the sealing cap facing the upper thrust member in the axial direction is smaller than a gap therebetween in the vicinity of the portion is provided.

The sealing cap may include an upwardly protruding part protruded in an upward axial direction on an outer side of an inner edge thereof in the radial direction and a first downward protrusion part protruded in a downward axial direction on an outer side of the upwardly protruding part in the radial direction.

A first gap formed between facing surfaces of the upper thrust member and the lowermost portion of the first downward protrusion part in the axial direction, a second gap formed between facing surfaces of the upper thrust member and the uppermost portion of the upwardly protruding part in the axial direction, and a third gap formed between facing surfaces of the upper thrust member and the inner edge of the sealing cap in the radial direction may be narrow enough to form the labyrinth seal, wherein the first to third gaps have sequentially alternated relative sizes.

The first and third gaps may be larger that of the second gap.

The sealing cap may include a second downward protrusion part protruded in a downward axial direction on an outer side of an inner edge thereof in a radial direction.

A fourth gap formed between facing surfaces of the upper thrust member and the lowermost portion of the second downward protrusion part in the axial direction and a fifth gap formed between facing surfaces of the upper thrust member and the inner edge of the sealing cap in the radial direction may be narrow enough to form the labyrinth seal, wherein the fourth gap is smaller than the fifth gap.

An upper surface of the hub may be provided with a first seating part stepped in a downward axial direction so that the sealing cap is seated on an inner side thereof in a radial direction, and an outer edge of the sealing cap in the radial direction may be fitted into an outer surface of the first seating part in the radial direction.

An upper surface of the hub may be provided with a second seating part stepped in an upward axial direction so that the sealing cap is seated on an inner side thereof in a radial direction, and an outer edge of the sealing cap in the radial direction may be provided with a downwardly bent part protruded in a downward axial direction to form the second seating part.

At least one of facing surfaces of the sealing cap and the upper thrust member in the axial direction may have an oil repellent applied thereto.

An inner surface of the hub in a radial direction may be provided with a blocking groove or a blocking part stepped in an inner diameter direction, and at least a portion between the blocking groove or the blocking part and an inner surface of the hub in the radial direction contacting the sealing cap may have an oil repellent applied thereto.

A portion in which the sealing cap and the hub are coupled to each other may be filled with an adhesive.

The sealing cap may be formed by performing plastic deformation on a steel sheet formed of a material including iron or stainless steel.

Facing surfaces of the upper thrust member and the sleeve or the hub in the axial direction may have a liquid-vapor interface formed therebetween.

The shaft and the upper thrust member may be formed integrally with each other.

The sleeve and the hub may be formed integrally with each other.

The downwardly bent part and an outer surface of the second seating part in the radial direction may have an adhesive provided therebetween.

A lower end of the outer surface of the second seating part in the radial direction may be provided with an adhesive collecting groove.

An outer surface of the sealing cap in the radial direction and the outer surface of the first seating part in the radial direction may have an adhesive provided therebetween.

A lower end of the outer surface of the first seating part in the radial direction may be provided with an adhesive collecting groove.

According to another aspect of the present invention, there is provided a hard disk drive including: the spindle motor as described above; a recording disk installed on an outer side of the hub of the spindle motor in the radial direction; a ring shaped disk clamp provided on an outer surface of the hub in the radial direction and fixing the recording disk; and a top cover coupled to an upper end of one of the shaft and the upper thrust member one of which has an upper surface positioned to be higher than that of the other.

The hard disk drive may have a thickness standard of 5 mm or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
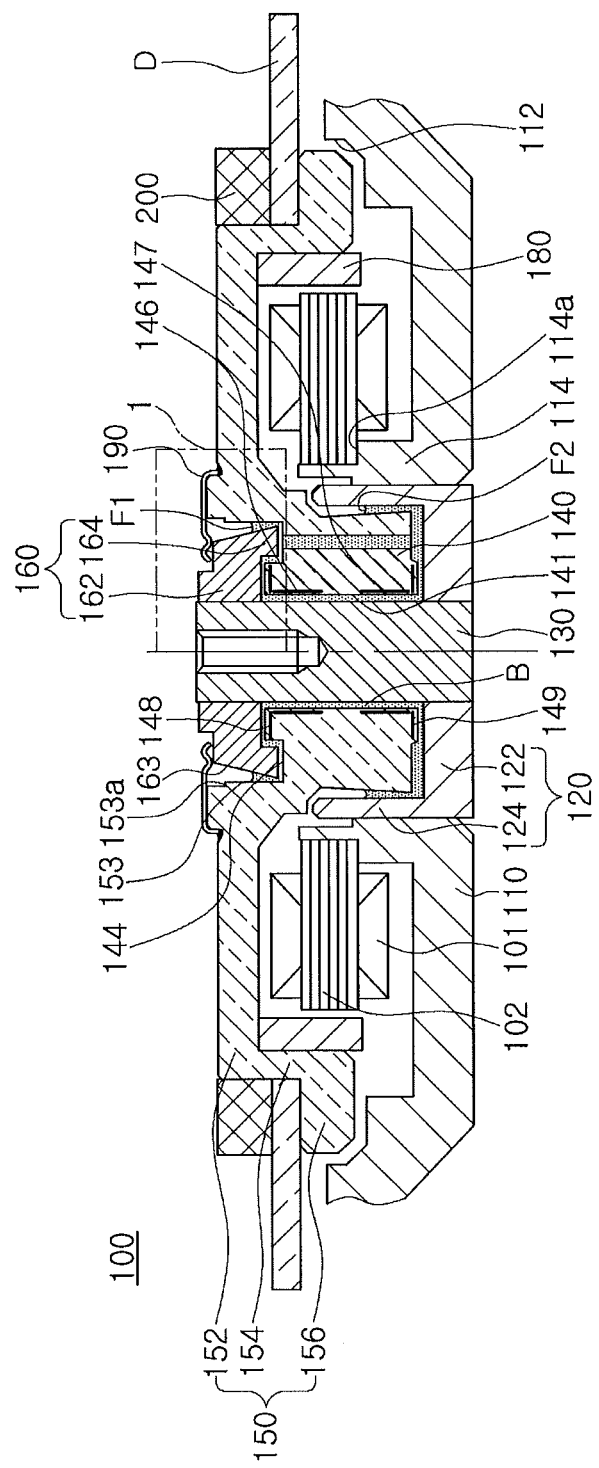
FIGS. 1 and 2 are cross-sectional views illustrating a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
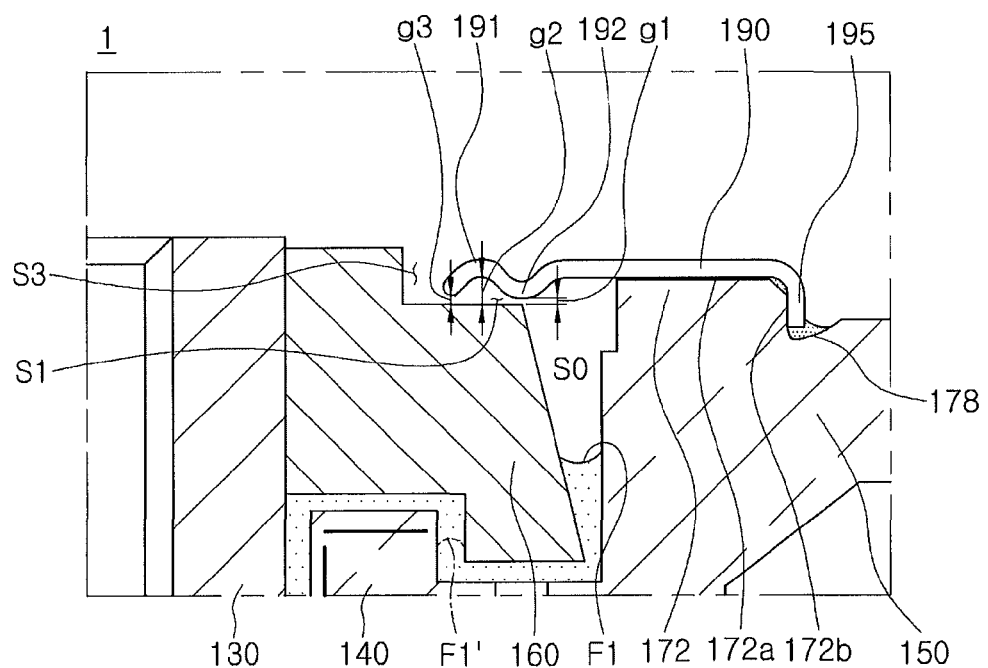

FIGS. 1 and 2 are cross-sectional views illustrating a spindle motor according to an embodiment of the present invention.

Referring to FIGS. 1 and 2, the spindle motor 100 according to the embodiment of the present invention may include a base member 110, a lower thrust member 120, a shaft 130, a sleeve 140, a hub 150, an upper thrust member 160, and a sealing cap 190.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, a radial direction refers to a horizontal direction, that is, a direction from the shaft 130 toward an outer peripheral surface of the hub 150 or from the outer peripheral surface of the hub 150 toward the shaft 130, and a circumferential direction refers to a rotation direction along a predetermined radius at the center of rotation. For example, the circumferential direction refers to a rotation direction along the outer peripheral surface of the hub 150.

In the spindle motor 100 according to the embodiment of the present invention, a rotating member may relatively rotate smoothly with respect to a fixed member using a hydrodynamic bearing assembly.

Here, the hydrodynamic bearing assembly may be configured of members rotating relatively by fluid pressure generated by a lubricating fluid and include the lower thrust member 120, the sleeve 140, the shaft 130, the upper thrust member 160, and the hub 150.

In addition, the rotating member, a member rotating relatively with respect to the fixed member, may include the sleeve 140, the hub 150, and a magnet 180 provided with the hub 150.

Further, the fixed member, a member relatively fixed to the rotating member, may include the base member 110, the shaft 130, the lower thrust member 120, and the upper thrust member 160.

The base member 110 may include a mounting groove 112 so as to form a predetermined space with respect to the hub 150. In addition, the base member 110 may include a coupling part 114 extended in an upward axial direction and having a stator core 102 installed on an outer peripheral surface thereof.

In addition, the coupling part 114 may include a seating surface 114a provided on the outer peripheral surface thereof so that the stator core 102 may be seated and installed thereon. Further, the stator core 102 seated on the coupling part 114 may be disposed over the mounting groove 112 of the base member 110 described above.

Meanwhile, the base member 110 according to the present embodiment may be manufactured by performing plastic working on a rolled steel sheet. More specifically, the base member 110 may be manufactured by a pressing method, a stamping method, a deep drawing method, or the like. However, the base member 110 is not limited to being manufactured by the above-mentioned method, but may be manufactured by various methods such as an aluminum die-casting method, and the like.

Meanwhile, since the base member 110 is manufactured by performing the plastic working on the rolled steel sheet, the base member 110 may have a thin and uniform thickness. Therefore, it may not be easy, to form the coupling part 114 included in the base member 110 to be integrated with the base member 110. Accordingly, in the case of the base member 110 according to the embodiment of the present invention, the coupling part 114 may be manufactured as a separate member and then coupled to the base member 110 at the time of assembling the spindle motor.

The lower thrust member 120 may be fixedly installed on the base member 110. That is, the lower thrust member 120 may be insertedly installed in the coupling part 114. More specifically, the lower thrust member 120 may be installed so that an outer peripheral surface thereof is bonded to an inner peripheral surface of the coupling part 114.

Meanwhile, the lower thrust member 120 may include a disk part 122 having an inner surface fixedly installed on the shaft 130 and an outer surface fixedly installed on the base member 110 and an extension part 124 extended from the disk part 122 in the upward axial direction.

That is, the lower thrust member 120 may have a cup shape with a hollow part. That is, the lower thrust member 120 may have a 'ㄷ' shaped cross section.

In addition, the disk part 122 may be provided with an installation hole 122a in which the shaft 130 is installed, and the shaft 130 may be insertedly mounted in the installation hole 122a.

Further, the lower thrust member 120 may be included, together with the base member 110, in a fixed member, that is, a stator.

Meanwhile, the outer surface of the lower thrust member 120 may be bonded to an inner surface of the base member 110 by an adhesive and/or welding. In other words, the outer surface of the lower thrust member 120 may be fixedly bonded to an inner surface of the coupling part 114 of the base member 110.

In addition, a lower thrust dynamic pressure groove 149 for generating thrust fluid dynamic pressure may be formed in at least one of an upper surface of the lower thrust member 120 and a lower surface 140b of the sleeve 140. Although the case in which the lower thrust dynamic pressure groove 149 is formed in the lower surface of the sleeve 140 has been shown in FIG. 1, the present invention is not limited thereto. That is, the lower thrust dynamic pressure groove 149 may be formed in the lower thrust member 120 facing the lower surface of the sleeve 140.

Further, the lower thrust member 120 may also serve as a sealing member for preventing the lubricating fluid from being leaked.

The shaft 130 may be fixedly installed on at least one of the lower thrust member 120 and the base member 110. That is, the shaft 130 may be installed so that a lower end portion thereof is inserted into the installation hole 122a formed in the disk part 122 of the lower thrust member 120.

In addition, the lower end portion of the shaft 130 may be bonded to an inner surface of the disk part 122 by an adhesive and/or welding. Therefore, the shaft 130 may be fixed.

However, although the case in which the shaft 130 is fixedly installed on the lower thrust member 120 has been described by way of example in the embodiment of the present invention, the present invention is not limited thereto. That is, the shaft 130 may also be fixedly installed on the base member 110. In the embodiment of the present invention, even in the case in which the shaft 130 is fixed to the base member 110 through the lower thrust member 120 or is fixed directly to the base member 110, it may be considered that the shaft 130 is installed on the base member 110.

Meanwhile, the shaft 130 may be also included, together with the lower thrust member 120 and the base member 110, in the fixed member, that is, the stator.

The shaft 130 may include a coupling unit, for example, a screw part 135 to which a screw is screwed, formed on an upper surface thereof so that a top cover 300 (See FIG. 9) is fixedly installed thereto.

The sleeve 140 may be installed to be rotatable with respect to the shaft 130. To this end, the sleeve 140 may include a through-hole 141 into which the shaft 130 is inserted. Meanwhile, in the case in which the sleeve 140 is installed around the shaft 130, an inner peripheral surface of the sleeve 140 and an outer peripheral surface of the shaft 130 may be disposed to be spaced apart from each other by a predetermined gap to form a bearing clearance B therebetween. In addition, the bearing clearance B may be filled with the lubricating fluid.

Meanwhile, the sleeve 140 may include a step surface 144 formed at the upper end portion thereof in order to form a labyrinth shaped sealing part between the step surface 144 of the sleeve 140 and the upper thrust member 160. The lubricating fluid may be firmly sealed by the labyrinth shaped sealing part formed by the step surface 144 and the upper thrust member 160.

Meanwhile, the upper thrust member 160 may have an inclined part 163 formed in an outer side surface of an upper end portion thereof so as to form a first liquid-vapor interface F1 between the upper thrust member 160 and the hub 150, wherein the inclined part 163 has an outer diameter smaller at an upper portion thereof than at a lower portion thereof.

In other words, the inclined part 163 having the outer diameter smaller at the upper portion thereof than at the lower portion thereof may be formed at the upper portion of the upper thrust member 160 so that the first liquid-vapor interface F1 may be formed in a space between an outer peripheral surface of the upper thrust member 160 and an inner peripheral surface of the hub 150.

However, according to the embodiment of the present invention, the first liquid-vapor interface may also be formed between the upper thrust member 160 and the sleeve 140. The first liquid-vapor interface corresponds to a part represented by 'F1'.

In addition, the sleeve 140 may have the hub 150 bonded to an outer peripheral surface thereof. That is, the sleeve 140 may include a bonding surface formed on the outer peripheral surface thereof.

Here, the sleeve 140 and the hub 150 may be formed integrally with each other. In the case in which the sleeve 140 and the hub 150 are formed integrally with each other, since both of the sleeve 140 and the hub 150 are provided as a single member, the number of components is decreased, whereby a product may be easily assembled and an assembly tolerance may be significantly decreased.

Meanwhile, a lower end portion of the outer peripheral surface of the sleeve 140 may be inclined upwardly in an inner diameter direction so as to form a liquid-vapor interface together with the extension part 124 of the lower thrust member 120.

That is, the lower end portion of the sleeve 140 may be inclined upwardly in the inner diameter direction so that a second liquid-vapor interface F2 may be formed in a space between the outer peripheral surface of the sleeve 140 and the extension part 124 of the lower thrust member 120. That is, a sealing part of the lubricating fluid may be formed in the space between the outer peripheral surface of the sleeve 140 and the extension part 124 of the lower thrust member 120.

As described above, since the second liquid-vapor interface F2 is formed in the space between the lower portion of the sleeve 140 and the extension part 124, the lubricating fluid provided in the bearing clearance B may form the first liquid-vapor interfaces F1 and F1' and the second liquid-vapor interface F2.

In addition, the sleeve 140 may include upper and lower radial dynamic pressure grooves 146 and 147 formed in an inner surface thereof in order to generate fluid dynamic pressure through the lubricating fluid provided in the bearing clearance B at the time of rotation thereof.

However, the upper and lower radial dynamic pressure grooves 146 and 147 are not limited to being formed in the inner surface of the sleeve 140 as shown in FIG. 1, but may also be formed in the outer peripheral surface of the shaft 130. In addition, the upper and lower radial dynamic pressure grooves 146 and 147 may have various shapes such as a herringbone shape, a spiral shape, a helical shape, and the like.

The hub 150 may be coupled to the sleeve 140 to rotate together therewith.

The hub 150 may include a hub body 152 provided with an insertion part in which the upper thrust member 160 is insertedly disposed, a cylindrical wall part 154 extended from an edge of the hub body 152 and including a magnet 180 mounted on an inner surface thereof, and a disk mounting part 156 extended from an edge of the cylindrical wall part 154 in the outer diameter direction.

Meanwhile, a lower end portion of an inner surface of the hub body 152 may be bonded to an outer surface of the sleeve 140. That is, the lower end portion of the inner surface of the hub body 152 may be bonded to the bonding surface of the sleeve 140 by an adhesive and/or welding.

Therefore, at the time of rotation of the hub 150, the sleeve 140 may rotate together with the hub 150.

In addition, the cylindrical wall part 154 may be extended from the hub body 152 in a downward axial direction. Further, the cylindrical wall part 154 may include the magnet 180 fixedly installed on the inner surface thereof.

An inner surface of the hub 150 in the radial direction, more specifically, an inner surface of the hub body 152 in the radial direction may be provided with a blocking groove (not shown) or a blocking part 153a stepped in the inner diameter direction, and at least a portion between the blocking groove (not shown) or the blocking part 153a and the inner surface of the hub 150 in the radial direction contacting the sealing cap 190 may have an oil repellent applied thereto.

The magnet 180 may have an annular ring shape and be a permanent magnet generating a magnetic field having predetermined strength by alternately magnetizing an N pole and an S pole in the circumferential direction.

Meanwhile, the magnet 180 may be disposed to face an edge of the stator core 102 having a coil 101 wound therearound and electromagnetically interact with the stator core 102 having the coil 101 wound therearound to generate driving force for rotating the hub 150.

Meanwhile, the upper thrust member 160 may be fixedly installed on an upper end portion of the shaft 130 and form the liquid-vapor interface together with the sleeve 140 or the hub 150.

The upper thrust member 160 may include a body 162 having an inner surface bonded to the shaft 130 and a protrusion part 164 extended from the body 162 in the downward axial direction and forming the liquid-vapor interface together with an inclined part 153.

The protrusion part 164 may be extended from the body 162 in the downward axial direction and have an inner surface facing the outer surface of the sleeve 140 and an outer surface facing the inner surface of the hub 150.

In addition, although not shown, the protrusion part 164 may be extended from the body 162 so as to be parallel to the shaft 130.

In addition, the upper thrust member 160, also a fixed member fixedly installed together with the base member 110, the lower thrust member 120, and the shaft 130, may be a member configuring the stator.

Meanwhile, since the upper thrust member 160 is fixedly installed on the shaft 130 and the sleeve 140 rotates together with the hub 150, the first liquid-vapor interface F1 may be formed in a space between the hub 150 and the protrusion part 164. Therefore, the inner surface of the hub 150 may be provided with the inclined part 153.

The protrusion part 164 of the upper thrust member 160 may be disposed in a space formed by the sleeve 140 and the hub 150. In addition, the lubricating fluid may be provided in a labyrinth form in the spaces respectively formed by the sleeve 140 and a lower surface of the body 162 of the upper thrust member 160, the outer side surface of the sleeve 140 and an inner side surface of the protrusion part 164, and an outer side surface of the protrusion part 164 and the inner side surface of the hub 150, such that a sealing part is formed.

Therefore, the first liquid-vapor interface F1 may be formed in the space formed (F1') by the outer side surface of the sleeve 140 and the inner side surface of the protrusion part 164 as well as the space formed by the outer surface of the upper thrust member 160 and the inner surface of the hub 150, as shown in FIG. 1. In the latter case, the outer circumferential surface of the sleeve 140 or the inner circumferential surface of the protrusion part 164 may be inclined to facilitate sealing of the lubricating fluid.

Meanwhile, an upper thrust dynamic pressure groove 148 for generating thrust dynamic pressure may be formed in at least one of a lower surface of the upper thrust member 160 and an upper surface of the sleeve 140 disposed to face the lower surface of the upper thrust member 160.

In addition, the upper thrust member 160 may also serve as a sealing member preventing the lubricating fluid provided in the bearing clearance B from being leaked upwardly.

Further, the upper thrust member 160 may be formed integrally with the shaft 130.

Figure 9:
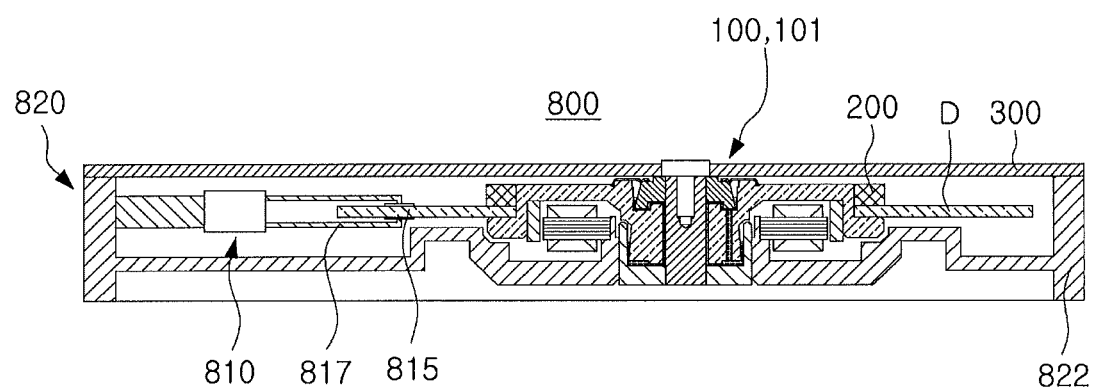
FIG. 9 is a schematic cross-sectional view of a disk driving device using the spindle motor according to the embodiment of the present invention.

Further, in the case in which the spindle motor 100 is mounted in a hard disk drive 800 as shown in FIG. 9, the top cover 300 may be mounted at the upper end of the shaft 130. In this case, when external force is applied to the top cover 300, a warpage amount of the top cover 300 may be increased in a radial direction, based on the shaft 130. Therefore, an upper surface of the upper thrust member 160 in the axial direction may be positioned at a position lower than that of the upper surface of the shaft 130 in the axial direction. However, the present invention is not limited thereto. That is, the upper surface of the upper thrust member 160 in the axial direction may be positioned at a position higher than that of the upper surface of the shaft 130 in the axial direction.

In addition, the spindle motor 100 according to the embodiment of the present invention may include the sealing cap 190 covering a space formed by the upper thrust member 160 and the hub 150 over the space.

The sealing cap 190 may be formed by performing plastic deformation on a steel sheet formed of a material including iron or stainless steel. More specifically, the sealing cap 190 may be manufactured by performing plastic working on a rolled steel sheet. The sealing cap 190 may be manufactured by a pressing method, a stamping method, a deep drawing method, or the like. However, the sealing cap 190 is not limited to being manufactured by the above-mentioned method, but may be manufactured by various methods such as an aluminum die-casting method, and the like.

Here, at least any one of facing surfaces of the sealing cap 190 and the upper thrust member 160 in the axial direction may have an oil repellent applied thereto.

The sealing cap 190 may have a ring shape and have an outer edge fixed to an upper surface of an inner portion of the hub 150. That is, the sealing cap 190 may be fixed to an upper surface of an inner portion of the hub body 152 in the radial direction.

In the spindle motor 100 according to the embodiment of the present invention, the sealing cap 190 may be mounted on the hub 150 and be extended to an upper portion of the upper thrust member 160 in the axial direction so as to cover a space S0 formed in the axial direction between the upper thrust member 160 and the hub 150. FIG. 2 is an enlarged view of a part '1' of FIG. 1.

Therefore, an upper surface of the hub 150 may be provided with a second seating part 172 stepped in the upward axial direction so that the sealing cap 190 is seated on an inner side thereof in the radial direction.

Therefore, an outer edge of the sealing cap 190 in the radial direction may be fixed to an upper surface of the second seating part 172.

Further, the sealing cap 190 may include a downwardly bent part 195 formed at an outer edge thereof in the radial direction to thereby be fitted into an outer surface 172b of the second seating part 172 in the radial direction.

Here, the sealing cap 190 may be coupled to the second sealing part 172 by various methods such as a press-fitting coupling method, a sliding coupling method, a welding coupling method, an adhesive bonding method, and the like.

Therefore, a portion in which the sealing cap 190 and the hub 150 are coupled to each other may be filled with the adhesive. More specifically, the downwardly bent part 195 and the outer surface of the second seating part 172 in the radial direction may have the adhesive provided therebetween. Further, a lower end of the outer surface 172b of the second seating part 172 in the radial direction may be provided with an adhesive collecting groove 178.

Here, a gap between facing surfaces of the sealing cap 190 and the upper thrust member 160 in the axial direction may be narrow enough to form a labyrinth seal.

Meanwhile, in the spindle motor 100 according to another embodiment of the present invention, a zeroth space S0 (a space from the first liquid-vapor interface F1' in a direction in which air moves in the case in which the first liquid-vapor interface F1' is formed between the upper trust member 160 and the sleeve 140) may be formed between the upper thrust member 160 and the hub 150 between which the first liquid-vapor interface F1 is formed.

In addition, the sealing cap 190 may include at least one or more curved parts curved so that a gap between the sealing cap 190 and the upper thrust member 160 at a portion of the sealing cap 190 facing the upper thrust member 160 in the axial direction is changed in the radial direction. Here, the curved parts may be formed so that at least one portion in which the gap between the sealing cap 190 and the upper thrust member 160 at the portion of the sealing cap 190 facing the upper thrust member 160 in the axial direction is smaller than a gap therebetween in the vicinity of the above-mentioned portion is provided.

More specifically, the sealing cap 190 may include an upwardly protruding part 191 protruded in the upward axial direction on an outer side of an inner edge thereof in the radial direction and a first downward protrusion part 192 protruded in the downward axial direction on an outer side of the upwardly protruding part 191 in the radial direction.

Here, a first gap g1 formed between facing surfaces of the upper thrust member 160 and the lowermost portion of the first downward protrusion part 192 in the axial direction, a second gap g2 formed between facing surfaces of the upper thrust member 160 and the uppermost portion of the upwardly protruding part 191 in the axial direction, and a third gap g3 formed between facing surfaces of the upper thrust member 160 and the inner edge of the sealing cap 190 in the radial direction may be narrow enough to form the labyrinth seal.

Further, relative sizes of the first gap g1, the second gap g2, and the third gap g3 may be sequentially alternated. That is, in the spindle motor 100 according to the present embodiment, the first and third gaps g1 and g3 may be larger than the second gap g2.

In this case, the spaces from the first liquid-vapor interface F1 or F1' to the outside, that is, in the direction in which the air moves may be formed in a sequence of the zeroth space S0, the first space S1, and the third space S3.

The space from the first liquid-vapor interface F1 or F1' to the outside, that is, in the direction in which the air moves may significantly increase a sealing effect of the labyrinth seal by the above-mentioned first to third gaps g1 to g3. In the case in which the spaces through which the fluid is leaked or scattered are formed as the labyrinth seal and the relative sizes of the gaps from the first liquid-vapor interface F1 or F1' to the outside, that is, in the direction in which the air moves are changed, since air pressure is continuously changed in the respective spaces S0, S1, and S3, a flow of the air may be more efficiently blocked. Since the leaked or scattered lubricating fluid is in a state that is substantially similar to a gas state, when the spaces are formed as described above so that a pressure difference may be continuously generated, the leakage or the scattering of the lubricating fluid may be may be significantly decreased efficiently.

Meanwhile, in the embodiment of the present invention, the sealing cap 190 may not include the downwardly bent part 195 at the outer edge thereof in the radial direction as in a sealing cap 197 to be described below with reference to FIGS. 3 and 4. In addition, in the embodiment of the present invention, the sealing cap 190 may also be fixed to a first sealing part 171 as in a sealing cap 197 to be described below with reference to FIGS. 3 and 4. Further, in the embodiment of the present invention, the sealing cap 190 may have an inner edge structure in the radial direction as in a sealing cap 197 to be described below with reference to FIGS. 3 and 4.

Recently, in accordance with thinness of a hard disk drive (HDD), a spindle motor mounted in the hard disk drive is also manufactured to have a thin thickness (a HDD standard of 5 mm or less). Therefore, in the thinned spindle motor, a length of the shaft is shortened, such that it is difficult to secure a span length between the upper and lower radial bearings.

According to the related art, a clamp is provided on an upper surface of a hub in an axial direction to occupy a space in the axial direction. However, in accordance with the thinness of the spindle motor, a method of allowing the clamp positioned on an upper surface of the hub in the axial direction to not occupy the space in the axial direction has been recently demanded in order to secure the span length of the radial bearing.

Therefore, the spindle motor according to the embodiment of the present invention may include a ring-shaped disk clamp 200 fitted into an outer surface of the rotating member, that is, the hub 150 in the radial direction to fix a recording disk D.

That is, in the embodiment of the present invention, the recording disk D may be disposed on an upper surface of the disk mounting part 156. Therefore, the disk clamp 200 may be fixed to an outer surface of the hub 150 in the radial direction, more specifically, an outer surface of the cylindrical wall part 154 in the radial simultaneously with pressing the recording disk D at an upper portion of the recording disk D in the axial direction.

Here, the disk clamp 200 may be coupled to the outer surface of the hub by various methods such as a screwing method, a press-fitting method, a clip coupling method, and the like. However, the present invention is not limited thereto. That is, various structural components may be used as long as they may be coupled to the outer surface of the hub 150 in the radial direction to fix the recording disk D.

Meanwhile, in the case of a thin shaft fixed type spindle motor 100 according to the embodiment of the present invention, the top cover 300 may be fixedly mounted on the upper end of the shaft 130. The top cover 300 may be provided along a part of which an upper surface in the axial direction is higher in the shaft 130 and the upper thrust member 160 disposed on an outer side of the shaft 130 in the radial direction (See FIG. 9).

Figure 3:
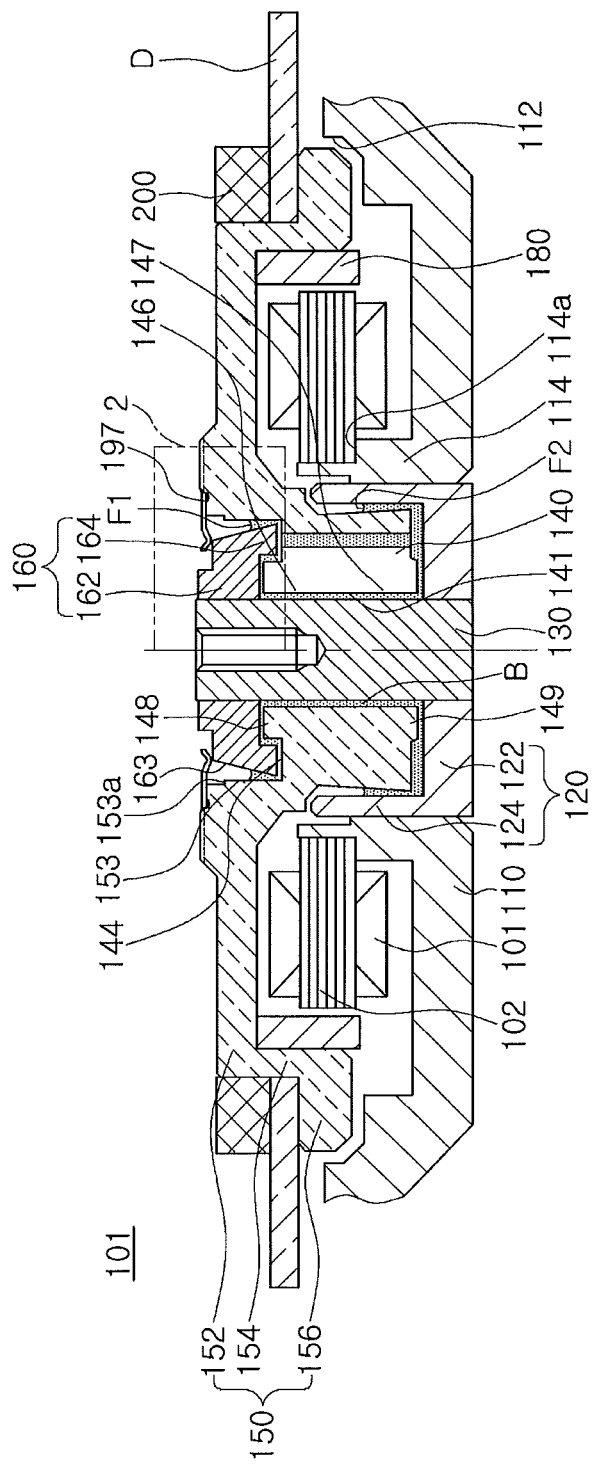
FIGS. 3 and 4 are cross-sectional views illustrating a spindle motor according to another embodiment of the present invention.
Figure 4:
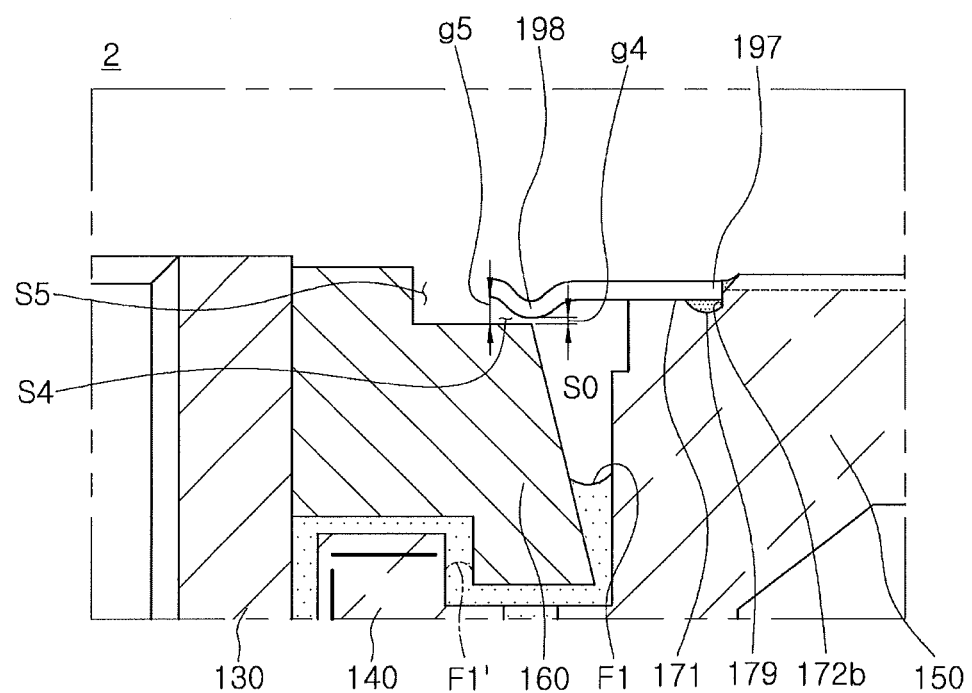

FIGS. 3 and 4 are cross-sectional views illustrating a spindle motor according to another embodiment of the present invention.

Referring to FIGS. 3 and 4, the spindle motor 101 according to another embodiment of the present invention is different in terms of a structure of a sealing cap 197 and a structure in which the sealing cap 197 is mounted on the hub 150 from the spindle motor 100 according to the embodiment of the present invention. Therefore, components of the spindle motor 101 according to another embodiment of the present invention that are different from those of the spindle motor 100 according to the embodiment of the present invention will be mainly described, and a description of components of the spindle motor 101 according to another embodiment of the present invention that are the same as those of the spindle motor 100 according to the embodiment of the present invention will be omitted.

In the spindle motor 101 according to another embodiment of the present invention, the sealing cap 197 may be mounted on the hub 150 and be extended to an upper portion of the upper thrust member 160 in the axial direction so as to cover a space S0 formed in the axial direction between the upper thrust member 160 and the hub 150. FIG. 4 is an enlarged view of a part '2' of FIG. 3.

Therefore, an upper surface of the hub 150 may be provided with a first seating part 171 stepped in the downward axial direction so that the sealing cap 197 is seated on an inner side thereof in the radial direction.

Therefore, an outer edge of the sealing cap 197 in the radial direction may be fixed to an upper surface of the first seating part 171.

Further, the outer edge of the sealing cap 197 in the radial direction may be fitted into an outer surface 171b of the first seating part 171 in the radial direction.

Here, the sealing cap 197 may be coupled to the first sealing part 171 by various methods such as a press-fitting coupling method, a sliding coupling method, a welding coupling method, an adhesive bonding method, and the like.

Therefore, a portion in which the sealing cap 197 and the hub 150 are coupled to each other may be filled with the adhesive. More specifically, an outer surface of the sealing cap 197 in the radial direction and the outer surface of the first seating part 171 in the radial direction may have the adhesive provided therebetween. Further, a lower end of the outer surface 171b of the first seating part 171 in the radial direction may be provided with an adhesive collecting groove 179.

Here, a gap between facing surfaces of the sealing cap 197 and the upper thrust member 160 in the axial direction may be narrow enough to form a labyrinth seal.

Meanwhile, in the spindle motor 101 according to the embodiment of the present invention, a zeroth space S0 (a space from the first liquid-vapor interface F1' in a direction in which air moves in the case in which the first liquid-vapor interface F1' is formed between the upper trust member 160 and the sleeve 140) may be formed between the upper thrust member 160 and the hub 150 between which the first liquid-vapor interface F1 is formed.

In addition, the sealing cap 197 may include at least one curved part 198 curved so that a gap between the sealing cap 197 and the upper thrust member 160 at a portion of the sealing cap 197 facing the upper thrust member 160 in the axial direction is changed in the radial direction. Here, the curved part 198 may be formed so that at least one portion in which the gap between the sealing cap 197 and the upper thrust member 160 at the portion of the sealing cap 197 facing the upper thrust member 160 in the axial direction is smaller than a gap therebetween in the vicinity of the above-mentioned portion is provided.

More specifically, the sealing cap 197 may include a second downward protrusion part 198 protruded in the downward axial direction on an outer side of an inner edge thereof in the radial direction.

Here, a fourth gap g4 formed between facing surfaces of the upper thrust member 160 and the lowermost portion of the second downward protrusion part 198 in the axial direction and a fifth gap g5 formed between facing surfaces of the upper thrust member 160 and the inner edge of the sealing cap 190 in the radial direction may be narrow enough to form the labyrinth seal.

Further, relative sizes of the fourth gap g4 and the fifth gap g5 may be sequentially alternated. That is, in the spindle motor 101 according to the present embodiment, the fifth gap g5 may be larger than the fourth gap g4.

In this case, the spaces from the first liquid-vapor interface F1 or F1' to the outside, that is, in the direction in which the air moves may be formed in a sequence of the zeroth space S0, the fourth space S4, and the fifth space S5.

The space from the first liquid-vapor interface F1 or F1' to the outside, that is, in the direction in which the air moves, may significantly increase a sealing effect of the labyrinth seal by the above-mentioned fourth and fifth gaps g4 and g5. In the case in which the spaces through which the fluid is leaked or scattered are formed as the labyrinth seal and the relative sizes of the gaps from the first liquid-vapor interface F1 or F1' to the outside, that is, in the direction in which the air moves are changed, since air pressure is continuously changed in the respective spaces S0, S4, and S5, a flow of the air may be more efficiently blocked. Since the leaked or scattered lubricating fluid is in a state that it is substantially similar to a gas state, when the spaces are formed as described above so that a pressure difference may be continuously generated, the leakage or the scattering of the lubricating fluid may be significantly decreased efficiently.

Meanwhile, in another embodiment of the present invention, the sealing cap 197 may include a downwardly bent part 195 formed at an outer edge thereof in the radial direction as in the sealing cap 190 described with reference to FIGS. 1 and 2. In addition, in another embodiment of the present invention, the sealing cap 197 may also be fixed to the second seating part 172 as in the sealing cap 190 described with reference to FIGS. 1 and 2. Further, in the embodiment of the present invention, the sealing cap 197 may have the inner edge structure in the radial direction as in the sealing cap 190 described with reference to FIGS. 1 and 2.

FIGS. 5 through 8 are views illustrating a shape of a sealing cap according to the embodiment of the present invention.

Figure 5:
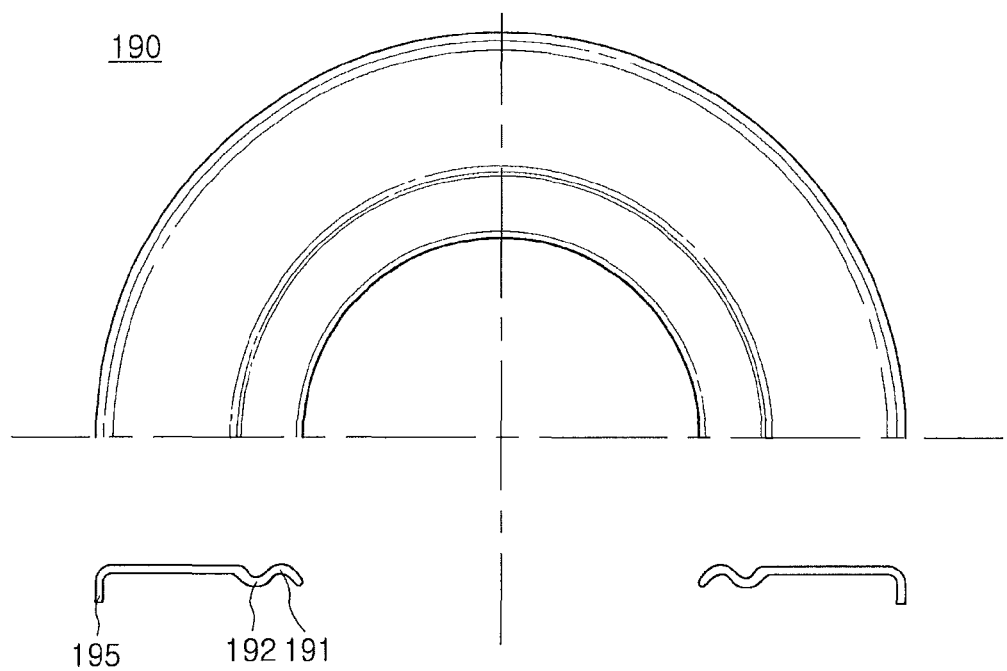
FIGS. 5 through 8 are views illustrating a shape of a sealing cap according to the embodiment of the present invention.

Referring to FIG. 5, the sealing cap 190 according to the embodiment of the present invention may have the same cross section as that of the sealing cap 190 described with reference to FIGS. 1 and 2.

That is, the sealing cap 190 may include an upwardly protruding part 191 protruded in the upward axial direction on an outer side of an inner edge thereof in the radial direction and a first downward protrusion part 192 protruded in the downward axial direction on an outer side of the upwardly protruding part 191 in the radial direction. Further, the outer edge of the sealing cap 190 in the radial direction may be provided with a downwardly bent part 195 curved in the downward axial direction.

Here, the upwardly protruding part 191 and the first downward protrusion part 192 may be formed to have a circular shape in the circumferential direction. In this structure, even in the case that the rotor of the spindle motor is rotated, separate pumping force is not generated.

Meanwhile, the sealing cap 190 may not include the downwardly bent part 195 at the outer edge thereof in the radial direction.

Figure 6:
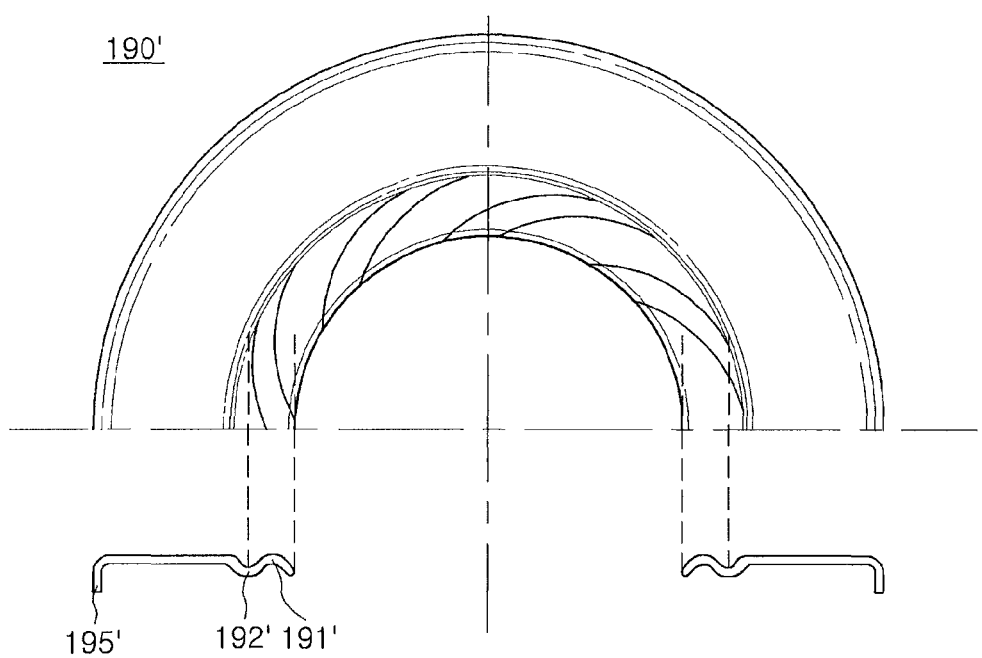

Referring to FIG. 6, the sealing cap 190' according to another embodiment of the present invention may have the same cross section as that of the sealing cap 190 described with reference to FIGS. 1 and 2.

That is, the sealing cap 190' may include an upwardly protruding part 191' protruded in the upward axial direction on an outer side of an inner edge thereof in the radial direction and a first downward protrusion part 192' protruded in the downward axial direction on an outer side of the upwardly protruding part 191' in the radial direction. Further, the outer edge of the sealing cap 190 in the radial direction may be provided with a downwardly bent part 195' curved in the downward axial direction.

Here, the upwardly protruding part 191' and the first downward protrusion part 192' may be formed to have a spiral shape repeated in the circumferential direction. In this structure, in the case in which the rotor of the spindle motor is rotated, since pumping force pumping the air in the inner diameter direction is generated, sealing force of the lubricating fluid may be improved.

Meanwhile, the sealing cap 190' may not include the downwardly bent part 195' at the outer edge thereof in the radial direction.

Figure 7:
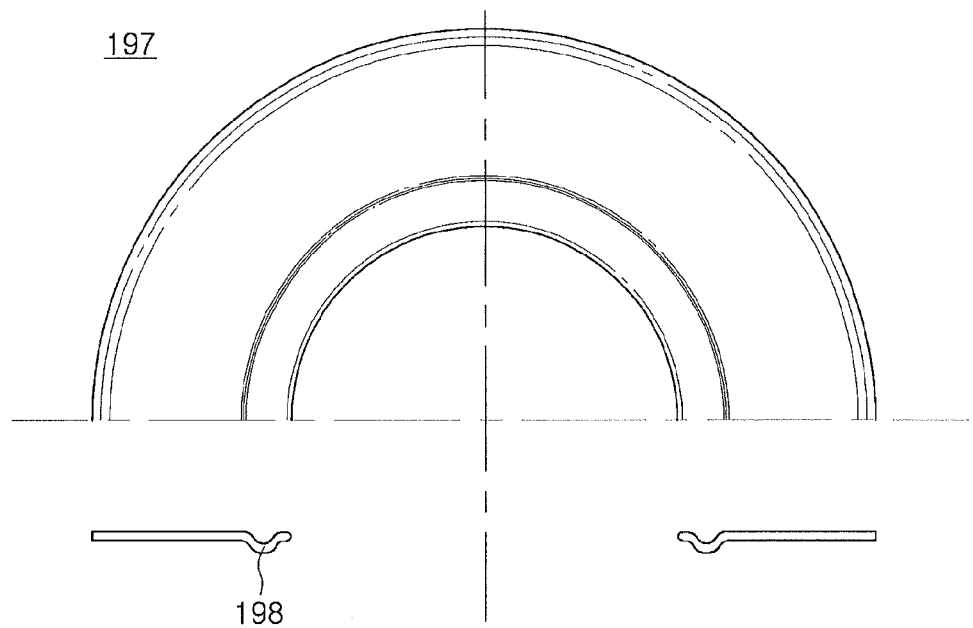

Referring to FIG. 7, the sealing cap 197 according to another embodiment of the present invention may have the same cross section as that of the sealing cap 197 described with reference to FIGS. 3 and 4.

That is, the sealing cap 197 may include a second downward protrusion part 198 protruded in the downward axial direction on an outer side of an inner edge thereof in the radial direction.

Here, the second downward protrusion part 198 may be formed to have a circular shape in the circumferential direction. In this structure, even in the case that the rotor of the spindle motor is rotated, separate pumping force is not generated.

Meanwhile, the sealing cap 197 may also include a downwardly bent part 195 formed at the outer edge thereof in the radial direction as shown in FIG. 5 or FIG. 6.

Figure 8:
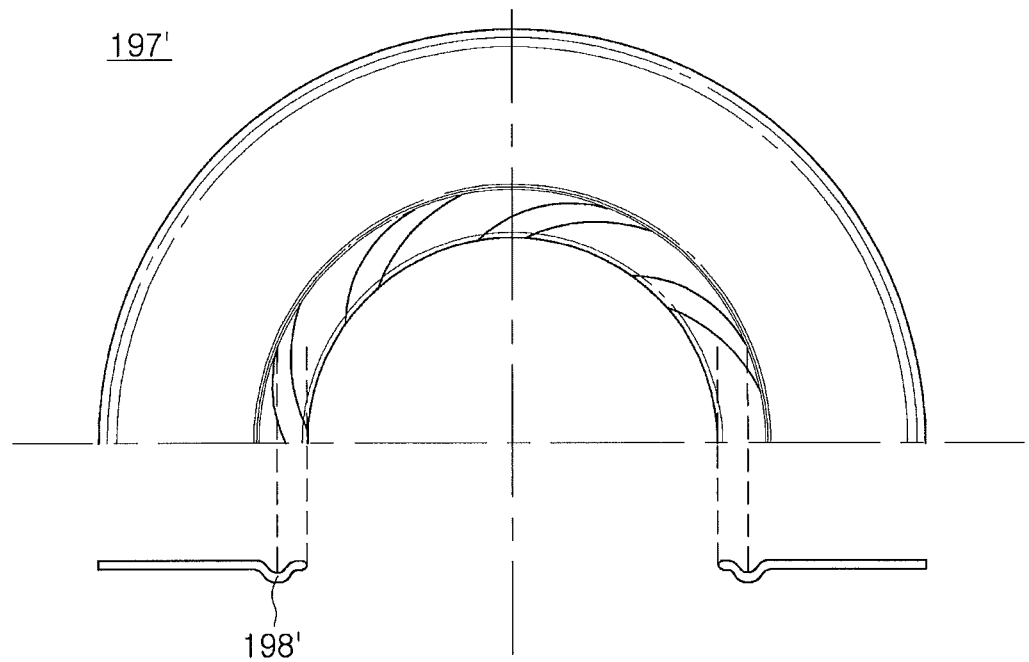

Referring to FIG. 8, the sealing cap 197' according to another embodiment of the present invention may have the same cross section as that of the sealing cap 197 described with reference to FIGS. 3 and 4.

That is, the sealing cap 197' may include a second downward protrusion part 198' protruded in the downward axial direction on an outer side of an inner edge thereof in the radial direction.

Here, the second downward protrusion part 198' may be formed to have a spiral shape repeated in the circumferential direction. In this structure, in the case in which the rotor of the spindle motor is rotated, since pumping force pumping the air in the inner diameter direction is generated, sealing force of the lubricating fluid may be improved.

Meanwhile, the sealing cap 197' may also include a downwardly bent part 195 formed at the outer edge thereof in the radial direction as shown in FIG. 5 or FIG. 6.

FIG. 9 is a schematic cross-sectional view of a disk driving device using the spindle motor according to the embodiment of the present invention.

Referring to FIG. 9, a recording disk driving device 800 having the spindle motor 100 or 101 according to the embodiment of the present invention mounted therein may be a hard disk drive and include the spindle motor 100 or 101, a head transfer part 810, and a housing 820. A thickness standard of the recording disk driving device 800 may be 5 mm or less.

The spindle motor 100 or 101 may have all the characteristics of the spindle motor according to the embodiment of the present invention described above and have a recording disk D mounted thereon. The recording disk D may be fixed by the disk clamp 200.

The head transfer part 810 may transfer a magnetic head 815 detecting information of the recording disk 830 mounted in the spindle motor 100 or 101 to a surface of the recording disk of which the information is to be detected.

Here, the magnetic head 815 may be disposed on a support part 817 of the head transfer part 810.

The housing 820 may include a motor mounting plate 822 and a top cover 300 shielding an upper portion of the motor mounting plate 822 in order to form an internal space receiving the spindle motor 100 or 101 and the head transfer part 810 therein.

The head transfer part 810 may be formed of a voice coil motor (VCM).

As set forth above, with the spindle motor according to the embodiment of the present invention, the clamp fixing the recording disk may not occupy a space in the axial direction.

In addition, the spindle motor having the structure capable of efficiently decreasing scattering of the lubricating fluid may be provided.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
    a shaft fixedly installed on a base member and including an upper thrust member provided in an upper portion thereof and protruded in an outer diameter direction;
    a sleeve rotatably supported by the shaft by fluid dynamic pressure;
    a hub extended from the sleeve in an outer diameter direction; and
    a sealing cap mounted on the hub and extended to an upper portion of the upper thrust member in an axial direction so as to cover a space formed between the upper thrust member and the hub in the axial direction, wherein the upper thrust member and the sleeve or the hub include a liquid-vapor interface formed therebetween, wherein a gap between facing surfaces of the sealing cap and the upper thrust member in the axial direction is narrow enough to form a labyrinth seal, wherein the sealing cap includes a curved part curved so that a gap between the sealing cap and the upper thrust member at a portion of the sealing cap facing the upper thrust member in the axial direction alternates in size in a radial direction, and wherein the sealing cap includes an upwardly protruding part protruded in an upward axial direction on an outer side of an inner edge thereof in the radial direction and a first downward protrusion part protruded in a downward axial direction on an outer side of the upwardly protruding part in the radial direction.

2. The spindle motor of claim 1, wherein the curved part is formed so that at least one portion in which the gap between the sealing cap and the upper thrust member at the portion of the sealing cap facing the upper thrust member in the axial direction is smaller than a gap therebetween in the vicinity of the portion is provided.

3. The spindle motor of claim 1, wherein a first gap formed between facing surfaces of the upper thrust member and the lowermost portion of the first downward protrusion part in the axial direction, a second gap formed between facing surfaces of the upper thrust member and the uppermost portion of the upwardly protruding part in the axial direction, and a third gap formed between facing surfaces of the upper thrust member and the inner edge of the sealing cap in the radial direction are narrow enough to form the labyrinth seal, the first to third gaps having sequentially alternated relative sizes.

4. The spindle motor of claim 3, wherein the first and third gaps are larger than that of the second gap.

5. The spindle motor of claim 1, wherein the sealing cap includes a second downward protrusion part protruded in a downward axial direction on an outer side of an inner edge thereof in a radial direction.

6. The spindle motor of claim 5, wherein a fourth gap formed between facing surfaces of the upper thrust member and the lowermost portion of the second downward protrusion part in the axial direction and a fifth gap formed between facing surfaces of the upper thrust member and the inner edge of the sealing cap in the radial direction are narrow enough to form the labyrinth seal, the fourth gap being smaller than the fifth gap.

7. The spindle motor of claim 1, wherein an upper surface of the hub is provided with a first seating part stepped in a downward axial direction so that the sealing cap is seated on an inner side thereof in a radial direction, and an outer edge of the sealing cap in the radial direction is fitted into an outer surface of the first seating part in the radial direction.

8. A spindle motor comprising:
a shaft fixedly installed on a base member and including an upper thrust member provided in an upper portion thereof and protruded in an outer diameter direction;
a sleeve rotatably supported by the shaft by fluid dynamic pressure;
a hub extended from the sleeve in an outer diameter direction; and
a sealing cap mounted on the hub and extended to an upper portion of the upper thrust member in an axial direction so as to cover a space formed between the upper thrust member and the hub in the axial direction, wherein the upper thrust member and the sleeve or the hub include a liquid-vapor interface formed therebetween, wherein a gap between facing surfaces of the sealing cap and the upper thrust member in the axial direction is narrow enough to form a labyrinth seal, wherein the sealing cap includes a curved part curved so that a gap between the sealing cap and the upper thrust member at a portion of the sealing cap facing the upper thrust member in the axial direction alternates in size in a radial direction, wherein an upper surface of the hub is provided with a second seating part stepped in an upward axial direction so that the sealing cap is seated on an inner side thereof in a radial direction, and an outer edge of the sealing cap in the radial direction is provided with a downwardly bent part protruded in a downward axial direction to form the second seating part.

9. The spindle motor of claim 1, wherein at least one of facing surfaces of the sealing cap and the upper thrust member in the axial direction has an oil repellent applied thereto.

10. A spindle motor comprising:
a shaft fixedly installed on a base member and including an upper thrust member provided in an upper portion thereof and protruded in an outer diameter direction;
a sleeve rotatably supported by the shaft by fluid dynamic pressure;
a hub extended from the sleeve in an outer diameter direction; and
a sealing cap mounted on the hub and extended to an upper portion of the upper thrust member in an axial direction so as to cover a space formed between the upper thrust member and the hub in the axial direction, wherein the upper thrust member and the sleeve or the hub include a liquid-vapor interface formed therebetween, wherein a gap between facing surfaces of the sealing cap and the upper thrust member in the axial direction is narrow enough to form a labyrinth seal, wherein the sealing cap includes a curved part curved so that a gap between the sealing cap and the upper thrust member at a portion of the sealing cap facing the upper thrust member in the axial direction alternates in size in a radial direction, wherein an inner surface of the hub in a radial direction is provided with a blocking groove or a blocking part stepped in an inner diameter direction, and at least a portion between the blocking groove or the blocking part and an inner surface of the hub in the radial direction contacting the sealing cap has an oil repellent applied thereto.

11. The spindle motor of claim 1, wherein a portion in which the sealing cap and the hub are coupled to each other is filled with an adhesive.

12. The spindle motor of claim 1, wherein the sealing cap is formed by performing plastic deformation on a steel sheet formed of a material including iron or stainless steel.

13. The spindle motor of claim 1, wherein facing surfaces of the upper thrust member and the sleeve or the hub in the axial direction have a liquid-vapor interface formed therebetween.

14. The spindle motor of claim 1, wherein the shaft and the upper thrust member are formed integrally with each other.

15. The spindle motor of claim 1, wherein the sleeve and the hub are formed integrally with each other.

16. The spindle motor of claim 8, wherein the downwardly bent part and an outer surface of the second seating part in the radial direction have an adhesive provided therebetween.

17. The spindle motor of claim 16, wherein a lower end of the outer surface of the second seating part in the radial direction is provided with an adhesive collecting groove.

18. The spindle motor of claim 7, wherein an outer surface of the sealing cap in the radial direction and the outer surface of the first seating part in the radial direction have an adhesive provided therebetween.

19. The spindle motor of claim 18, wherein a lower end of the outer surface of the first seating part in the radial direction is provided with an adhesive collecting groove.

20. A hard disk drive comprising:
   the spindle motor of claim 1;
   a recording disk installed on an outer side of the hub of the spindle motor in the radial direction;
   a ring shaped disk clamp provided on an outer surface of the hub in the radial direction and fixing the recording disk; and
   a top cover coupled to an upper end of one of the shaft and the upper thrust member one of which has an upper surface positioned to be higher than that of the other.

21. The hard disk drive of claim 20, having a thickness standard of 5 mm or less.

* * * * *